UNITED STATES PATENT OFFICE.

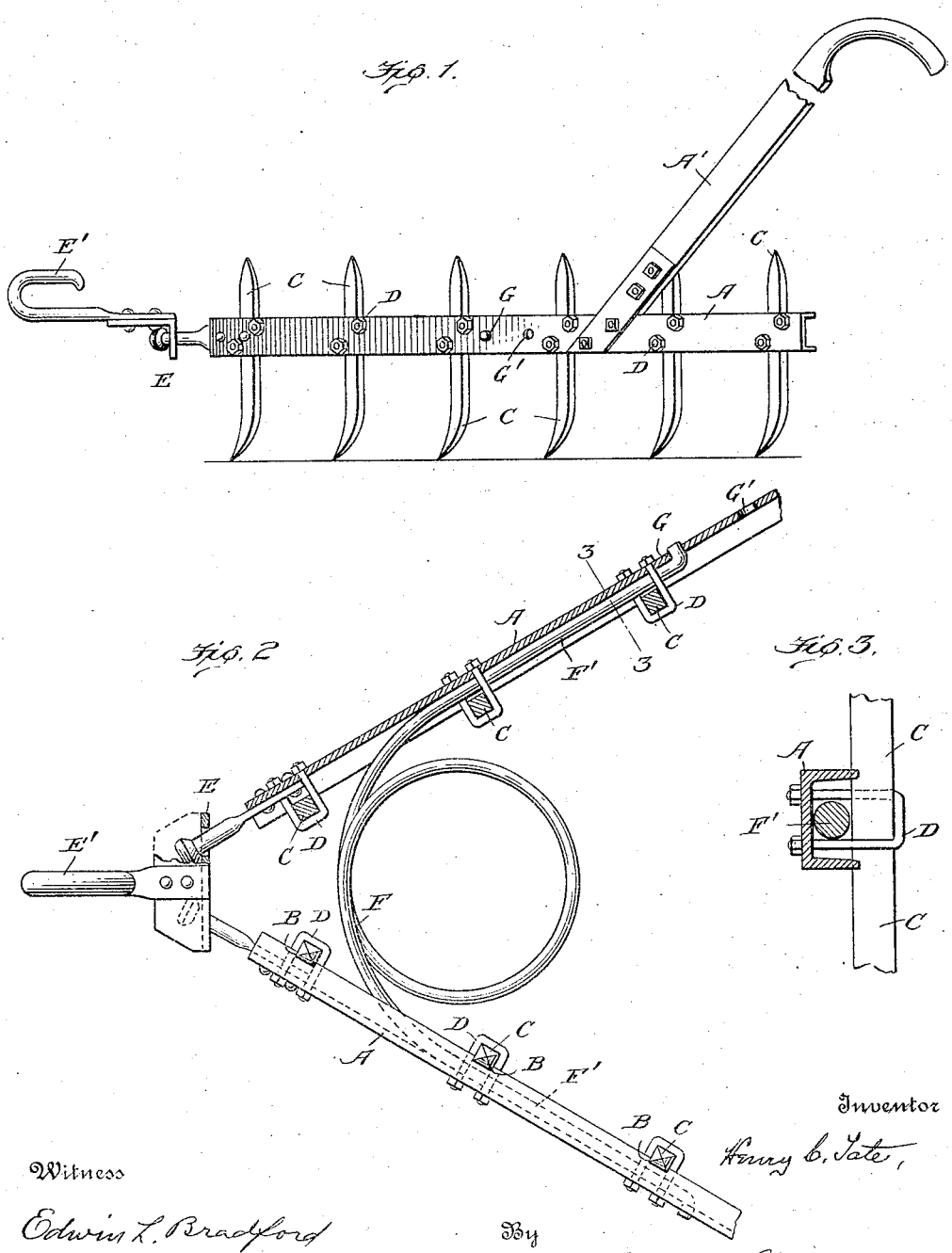

HENRY C. TATE, OF MEMPHIS, TENNESSEE.

CULTIVATOR.

1,305,502. Specification of Letters Patent. Patented June 3, 1919.

Application filed September 23, 1918. Serial No. 255,271.

*To all whom it may concern:*

Be it known that I, HENRY C. TATE, a citizen of the United States, and resident of Memphis, in the county of Shelby and State of Tennessee, have invented certain new and useful Improvements in Cultivators, of which the following is a specification, reference being had therein to the accompanying drawing.

This invention relates to cultivators such as are usually drawn by horses and controlled by handles held by a walking attendant. The objects are to secure, with simplicity and at low cost, various kinds of adjustment, including momentary adjustment of width by the attendant and automatic yielding of the teeth under certain conditions.

In the accompanying drawings,

Figure 1 is a side elevation of the cultivator.

Fig. 2 is a plan view, the handles being omitted.

Fig. 3 is a section on the line 3—3, Fig. 2.

In these figures, A designates rearwardly divergent tooth carrying bars, preferably channel bars of steel, provided with handles A' and having their horizontal webs notched at B to receive teeth C adjustably clamped in place by bolts D bent to U-shape and each passing through the vertical web of one of the channel bars. At its forward end each bar A is loosely swiveled in a vertical member E having a hook E', or the like, through which tractive power is applied, the swivel being such as to allow each bar some rotary movement about its axis and a material swinging movement in horizontal and other planes. Between the forward portions of the bars A is a strong spring coil F having arms F' each extending, loosely, rearward between the teeth and the vertical web of one of the bars A, and having its end portion bent sharply outward and entered in an aperture G in said vertical web. Each bar A has at some distance in the rear of the aperture G a similar aperture G', so that the spring may at will have its outwardly turned ends inserted in one or the other pair of apertures. If inserted in the rear apertures, the normal spread of the spring arms when under no tension determines the separation of the rear ends of the bars A. If the same spring be moved forward to the other pair of apertures, its elastic force will obviously increase the divergence of the bars. For still wider range of adjustment, it is usual to provide each machine with a plurality of springs of different normal spread, and to use at any time that spring which secures the desired spread of the bars A.

Obviously, more than two pairs of apertures may be provided, and by inclining them the teeth may be held, normally, inclined with respect to a vertical plane.

From the construction, it follows that the rear ends of the bars may, at any time, be pressed toward each other by the operator and be returned to normal position when released; that either bar may swing inward independently, and be restored to place by the spring; that either bar may rise independently and be restored to place by the spring; that either or both bars may rotate with or without swinging; and that the spring allows either set of teeth to pass an obstruction by swinging momentarily in any of many ways.

What I claim is:

1. In a cultivator the combination with a draft member of rearwardly diverging tooth-carrying bars, independently loosely swiveled in said member, and a horizontal spring between the forward portions of the bars and having rearwardly projecting arms with their ends engaging said bars and tending to hold them apart.

2. The combination with the widely separated rearwardly diverging bars, of a horizontal spring coil lying in the space between the forward portions of the bars and having arms lying alongside and with their ends secured to the bars, respectively, and means for connecting draft power to the forward ends of the bars while allowing all motions permitted to the bars by said spring.

3. The combination with a traction member, of channel bars connected by a universal joint to said member and extending rearwardly therefrom, teeth fixed to the horizontal webs of the channel bars, and a spring lying between the forward portions of the channel bars and having arms extending rearwardly and loosely held between the vertical web of the channel bars and the corresponding teeth and clamps, whereby the spring allows, yet yieldingly resists, the movement of each channel bar about its universal joint.

In testimony whereof I hereunto affix my signature.

HENRY C. TATE.

Copies of this patent may be obtained for five cents each, by addressing the "Commissioner of Patents, Washington, D. C."